United States Patent
Compain et al.

(10) Patent No.: US 6,177,995 B1
(45) Date of Patent: Jan. 23, 2001

(54) POLARIMETER AND CORRESPONDING MEASURING METHOD

(75) Inventors: Eric Compain, Paris; Bernard Drevillon, Clamart, both of (FR)

(73) Assignee: Centre National de la Recherche Scientifique, Paris Cedex (FR)

( * ) Notice: Under 35 U.S.C. 154(b), the term of this patent shall be extended for 0 days.

(21) Appl. No.: 09/297,202

(22) PCT Filed: Feb. 1, 1999

(86) PCT No.: PCT/FR99/00200

§ 371 Date: Oct. 7, 1999

§ 102(e) Date: Oct. 7, 1999

(87) PCT Pub. No.: WO99/40399

PCT Pub. Date: Aug. 12, 1999

(30) Foreign Application Priority Data

Feb. 9, 1998 (FR) .................................................... 98 01498

(51) Int. Cl.$^7$ ....................................................... G01J 4/00
(52) U.S. Cl. ........................... 356/366; 356/367; 356/369; 359/496
(58) Field of Search ..................................... 356/364, 365, 356/366, 367, 368, 369; 359/495, 496, 497

(56) References Cited

U.S. PATENT DOCUMENTS

| | | | | |
|---|---|---|---|---|
| 3,564,450 | * | 2/1971 | Immarco et al. ..................... | 359/495 |
| 4,556,292 | * | 12/1985 | Mathyseek et al. ................. | 359/394 |
| 5,337,146 | * | 8/1994 | Azzam ................................. | 356/367 |

* cited by examiner

*Primary Examiner*—Frank G. Font
*Assistant Examiner*—Sang H. Nguyen
(74) *Attorney, Agent, or Firm*—Young & Thompson

(57) ABSTRACT

A polarimeter includes a prism (32) for separating the incident light beam (21) having a Stokes vector (S) into a reflected beam (22) and a transmitted beam (23), the prism not inducing any interferential effect and the transmitted beam being subjected to at least a reflection internal to the prism. The polarimeter also include two final separators (3, 4) for separating respectively each of the reflected beam and the transmitted beam into at least two final beams (25–28), detecting means (5–8) for measuring the intensity levels of the final beams and a processing unit (9) producing the Stokes vector of the light to be measured. Preferably, the reflections internal to the prism (32) are either total reflections, or reflections on a thick absorbing layer. The invention also includes a method for measuring light beam polarization states.

10 Claims, 1 Drawing Sheet

POLARIMETER AND CORRESPONDING MEASURING METHOD

BACKGROUND OF THE INVENTION

1. Field of the Invention

This invention relates to a polarimeter and a method for measuring polarisation states of a light beam.

2. Description of the Related Art

Various types of polarimeters enabling to measure all the polarisation components of light, i.e. the four components of the Stokes S vector of light, are known. Notably the article 'Multichannel polarisation state detectors for time-resolved ellipsometry' by R. M. A. AZZAM, Thin Solid Films, vol. 234, pp. 371–374, 1993, exhibits techniques consisting in separating a beam to be measured into several beams and in processing then these different beams in parallel. The number n of final beams is at least equal to four, so that the n intensities measured of the final beams enable to access the four states of polarisation of light, i.e. the four components I, Q, U, V of the Stokes S vector.

Thus, AZZAM has described in the article 'Division-of-amplitude photopolarimeter (DOAP) for the simultaneous measurement of four Stokes parameters of light', Optica Acta, Vol. 29, N°5, pp. 685–689, 1982, a division-of-amplitude polarimeter whose principle is as follows: the incident light beam is first of all separated into a reflected beam and a transmitted beam by a beam-separating plate, then into four using two Wallaston prisms.

Such polarimeters enable, thanks to information multiplexing, real-time measurement of the polarisation components of light. Moreover, they require neither modulation nor mobile portion. However, since the separating plate produces interference effects, the properties of the polarimeter highly depend on the wavelength of light. Spectroscopic applications are therefore out of the question and it is generally necessary to conduct monochromatic measurements.

Another shortcoming of this device is its high sensitivity to the angle of incidence of the beam.

SUMMARY OF THE INVENTION

The present invention relates to a division-of-amplitude type polarimeter, which can be used in a very wide spectral window.

The polarimeter according to the invention can also be little sensitive to the angle of incidence. The more so, it may enable to obtain a good level of measuring sensitivity and low propagation of relative errors onto measured intensities, hence good accuracy on the Stokes S vector.

The invention also relates to a method for measuring polarisation states of a light beam with the advantages mentioned above.

To this end, the invention relates to a polarimeter comprising:

an initial separator designed for separating an incident beam of light to be measured with a Stokes vector into a reflected beam and a transmitted beam, whereas the separator has a reflection coefficient R, a couple of ellipsometric angles in reflection ($\psi_r$, $\Delta_r$), a transmission coefficient T and a couple of ellipsometric angles in transmission ($\psi_t$, $\Delta_t$);

two final separators designed for separating respectively each of the reflected and transmitted beams into at least two final beams, means of detection designed for measuring the intensities of the final beams, and a processing unit linked to the means of detection, producing the Stokes vector of the light to be measured.

According to the invention, the initial separator comprises a prism that does not induce any interference effect and having properties, notably such a refraction index $n_p$ and a configuration that the transmitted beam undergoes at least one reflection internal to the prism according to an angle of internal reflection.

By 'prism' is meant a solid obtained by cutting a prismatic surface with two parallel planes, whereas the prismatic surface is by definition generated by a fixed direction straight line that moves while hugging the periphery of a plane polygon constantly. The base of the prism is delineated by this plane polygon.

Each internal reflection of the transmitted beam inside the prism generates elementary phase shift between the linear component of polarisation in the incidence plane (component p) and the linear component perpendicular to the incidence plane (component s). The sum of these elementary phase shifts is equal to the ellipsometric angle $\Delta_r$.

According to a preferred embodiment of the polarimeter, the absence of interference effect during an internal reflection is obtained by ensuring that this reflection is total. This total reflection is produced thanks to the difference in the refraction index of the prism and of the air and thanks to the incidence of the beam transmitted onto the diopter of the prism on which internal reflection occurs.

According to another preferred embodiment of the polarimeter, the diopters of the prism on which internal reflections occur are covered with a thick absorbing layer. By 'thick absorbing layer' is meant a layer consisting of non-dielectric material having a thickness equal to several penetration lengths (the latter being defined as the reverse of absorption).

The final separators advantageously separate each of the reflected and transmitted beams into two final beams with different linear polarisations. The means of detection thus provide four measured intensities from which the processing unit calculates the components of the Stokes S vector. Preferably, the linear polarisations are orthogonal, whereby the final separators are Wallaston prisms. Moreover, the Wallaston prisms should be oriented by 45° with respect to the incidence plane. Other types of polarisers separating two orthogonal linear polarisations of a received beam are also quite suitable as final separators. Such elements enable to preserve wavelength independence.

The means of detection consist for instance of a set of photodetectors associated with the final beams respectively.

Unlike the division-of-amplitude polarimeter that uses a separating plate, the polarimeter according to the invention does not require any surface treatment producing interference effects and can, therefore, be very little sensitive to wavelength. Moreover, the absence of interference layer enables also to be relatively insensitive to the angle of incidence of the beam incident onto the initial separator. The influence of the angle of incidence is preferably reduced by appropriate selection of the refraction index $n_p$ of the prism, of its geometric properties and of the value of the angle of incidence.

The polarimeter according to the invention is also advantageously compact, which is quite important for in situ uses and need not integrate expensive optical components.

According to a first set of applications, the polarimeter is integrated to a conventional ellipsometer in order to improve the accuracy of measurements and to widen the scope of applications to depolarising media.

According to a second set of applications, the polarimeter is used as an independent component, for instance in astrophysics.

According to a third set of applications, the polarimeter is associated with a Mueller ellipsometer. It also enables to perform measurements on rough surfaces or particle systems, including in situ and in real time. Different ranges of uses include the treatment of various surfaces (steel and metals, . . . ), the detection of metallic objects (military applications, . . . ), the survey of anisotropic media (superconductors, . . . ), powder detection and characterisation (granulometry), environmental survey (aerosols, . . . ) and various medical applications.

The mathematical principles underlying the polarimeter are exposed below. They provide notably information useful for optimising the parameters of the polarimeter, in order to ensure low dependence on the angle of incidence, a good level of measuring sensitivity and/or little propagation of relative errors on the intensities when calculating the Stokes vector.

The number of measured intensities $i_k$ being equal to n ($n \geq 4$), the polarimeter is represented by a matrix A of dimension n×4, which verifies the relation ($<<^T>>$ designating the transposition operator):

$$(i_1\ i_2\ i_3\ \ldots\ i_n)^T = AS$$

In case when the number n of final beams is equal to 4, we have therefore, A being a real matrix 4×4:

$$S = A^{-1} \cdot (i_1\ i_2\ i_3\ i_4)^T$$

Preferably, the conditioning s (A) of the matrix A, provided by:

$$S(A) = \sqrt{\lambda_1/\lambda_4}$$

is maximised, where $\lambda_1$ and $\lambda_4$ are the smallest and the largest actual value of the matrix $A^T A$. Thus, propagation of the relative errors onto the intensities is minimised after multiplication by the matrix $A^{-1}$.

Moreover, the norm of the matrix A is advantageously maintained at sufficiently high value. Thus, good level of sensitivity is kept, because a significant fraction of the light intensity can be used.

Preferably, the function $\delta$ (A) given by:

$$\delta(A) = \sqrt{\sum_{i=j=1}^{4} \left(\frac{\partial A_{ij}}{\partial \phi_1}\right)^2}$$

Is minimised, where $A_{ij}$ designates the components of the matrix A and $\phi_1$ represents the angle of incidence on the prism of the initial separator.

As the means of detection are composed of four photodetectors with gains $G_1$, $G_2$, $G_3$ and $G_4$ respectively, the matrix A is equal to:

$$A = D \cdot \begin{pmatrix} 1 & -\cos 2\Psi_r & \sin 2\Psi_r \cos \Delta_r & \sin 2\Psi_r \sin \Delta_r \\ 1 & -\cos 2\Psi_r & -\sin 2\Psi_r \cos \Delta_r & -\sin 2\Psi_r \sin \Delta_r \\ 1 & -\cos 2\Psi_t & \sin 2\Psi_t \cos \Delta_t & \sin 2\Psi_t \sin \Delta_t \\ 1 & -\cos 2\Psi_t & -\sin 2\Psi_t \cos \Delta_t & -\sin 2\Psi_t \sin \Delta_t \end{pmatrix} \text{ with}$$

$$D = \frac{1}{2} \begin{pmatrix} G_1 R & 0 & 0 & 0 \\ 0 & G_2 R & 0 & 0 \\ 0 & 0 & G_3 T & 0 \\ 0 & 0 & 0 & G_4 T \end{pmatrix}$$

The gains $G_k$ of the photodetectors being, for exemplification purposes, identical, the conditioning of A is optimal when:

$$R = T \approx \frac{1}{2}$$

$$\psi_r = \psi_t = \pi/8 \text{ modulo } \pi/4$$

$$\Delta_r - \Delta_t = \pi/2 \text{ modulo } \pi$$

In the absence of interference effects, $\Delta_r$ is nil and the optimum corresponds therefore to:

$$\Delta_t = \pi/2 \text{ modulo } \pi$$

Preferably, the sum of the additional phase shifts by internal reflections is then close to $\pi/2$. According to an advantageous embodiment, the sensitivity of the angle of incidence $\phi_1$ on the prism of the initial separator is weakened while minimising sensitivity to the angle of incidence on each of the diopters corresponding to an internal reflection. Thus, in the first embodiment with total internal reflections, the angles of internal reflections $\phi_3$ are optimally equal to the angle $\phi_m$ for which elementary phase shifts $\Delta$ exhibit a maximum $\Delta_m$:

$$\cos \Phi_m = \sqrt{\frac{n_p^2 - 1}{n_p^2 + 1}} \Rightarrow \begin{cases} \Delta_m = \pi + 4 \text{ArcTan}(n_p) \\ \frac{\partial \Delta}{\partial \Phi} = 0 \end{cases}$$

Generally, it is necessary to choose between good conditioning s(A) and low sensitivity $\delta$(A) of the matrix A. According to the requirements associated with the measurements, it may prove judicious to privilege one of both criteria in relation to the other. Advantageously, s(A) is greater than 0.3 (good conditioning) and/or $\delta$(A) is smaller than 1 (low sensitivity to the angle of incidence).

According to a preferred embodiment, at least one of the reflections internal to the prism of the initial separator is a total reflection. It is then interesting that the angles of internal reflections $\phi_3$ corresponding to the total reflections provide approximately the relation:

$$\cos \phi_3 = \sqrt{\frac{n_p^2 - 1}{n_p^2 + 1}}$$

According to another preferred embodiment, at least one of the reflections internal to the prism of the initial separator is a reflection onto a thick absorbing layer.

According to a first advantageous embodiment of the prism, the former has a triangular base comprising a first side, a second side forming a first angle of aperture with the first side and a third side forming a second angle of aperture with the second side, whereas the first, second and third sides of the base are respectively associated with the first, second and third faces of the prism. The incident beam reaching the first face according to an angle of incidence parallel to the base and separated on the first face into reflected and transmitted beams, the transmitted beam undergoes the 5 internal reflection on the second face and goes out through the third face.

In preferred examples corresponding to the embodiment with triangular base of the prism, the internal reflection is total, the refraction index of the prism ranges between 2.5 and 2.0 over a wavelength range between 0.4 $\mu$m and 14 $\mu$m and the angle of incidence and the first and second angles of aperture are respectively, plus or minus one degree:
in a first preferred example: 81°, 57° and 33°, and
in a second preferred example: 48°, 51° and 33°.

In a second advantageous embodiment of the prism, the former has a polygonal base comprising at least a first side, a second side forming with the first side an angle of aperture, a third side parallel to the first side and a fourth side parallel to the second side, whereas the first, second, third and fourth sides of the base are respectively associated with first, second, third and fourth faces of the prism. The incident beam reaches the first face according to an angle of incidence parallel to the base and is separated on 20 the first face into the reflected and transmitted beams, the transmitted beam undergoes respectively a first and a second internal reflections on the second and fourth faces and goes out through the third face.

According to a preferred example of this embodiment with a polygonal base, the refraction index of the prism ranges between 1.85 and 1.75 on a wavelength range comprised between 0.4 and 2 μm and the angle of incidence and the angle of aperture are respectively 78.5° and 68°, plus or minus one degree.

The invention also relates to a method for measuring polarisation states of a light beam with a Stokes vector in which:

the light beam to be measured is separated into a reflected beam and a transmitted beam, each of the reflected and transmitted beams are separated into at least two final beams, the intensities of the final beams are measured, and the Stokes vector of the light to be measured is produced on the basis of these intensities.

According to the invention, the transmitted beam undergoes at least one reflection internal to a prism, without inducing any interference effect.

BRIEF DESCRIPTION OF THE DRAWINGS

The invention will be understood better with reference to particular embodiments and implementations, given for exemplification purposes and illustrated on the appended drawings.

DESCRIPTION OF THE PREFERRED EMBODIMENTS

Figure 1:
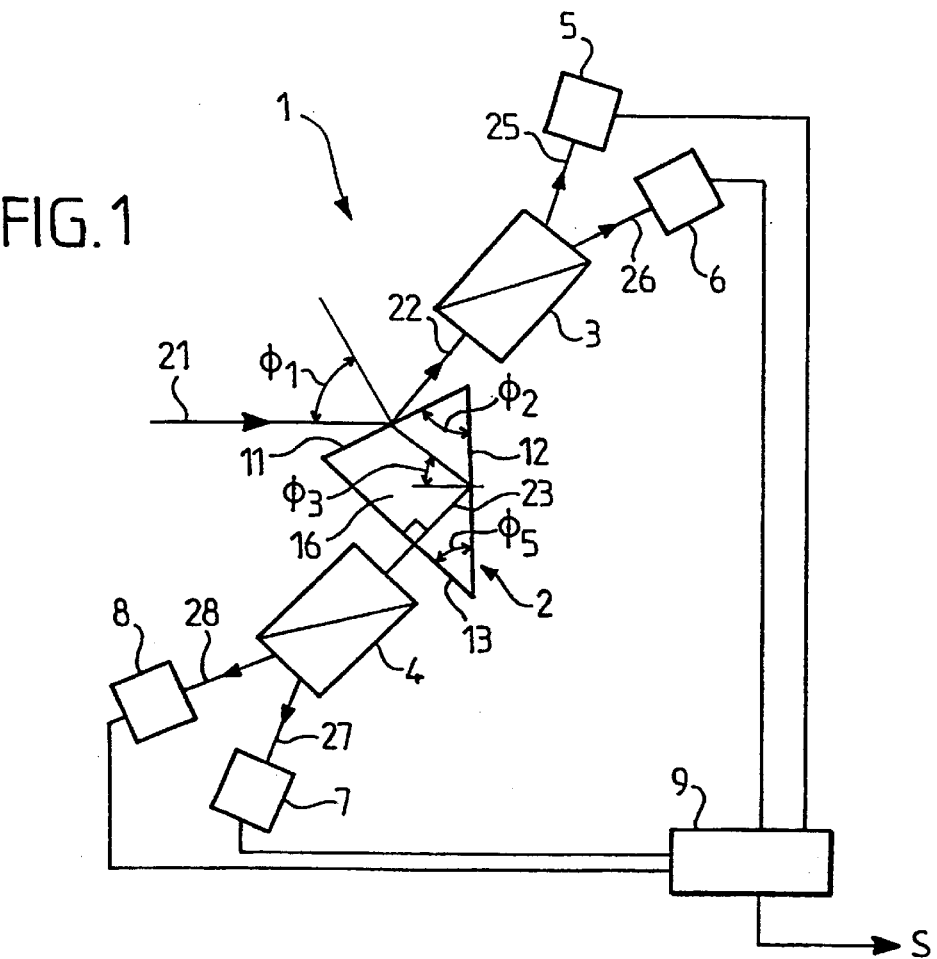
FIG. 1 represents a first embodiment of a polarimeter according to the invention.
Figure 2:
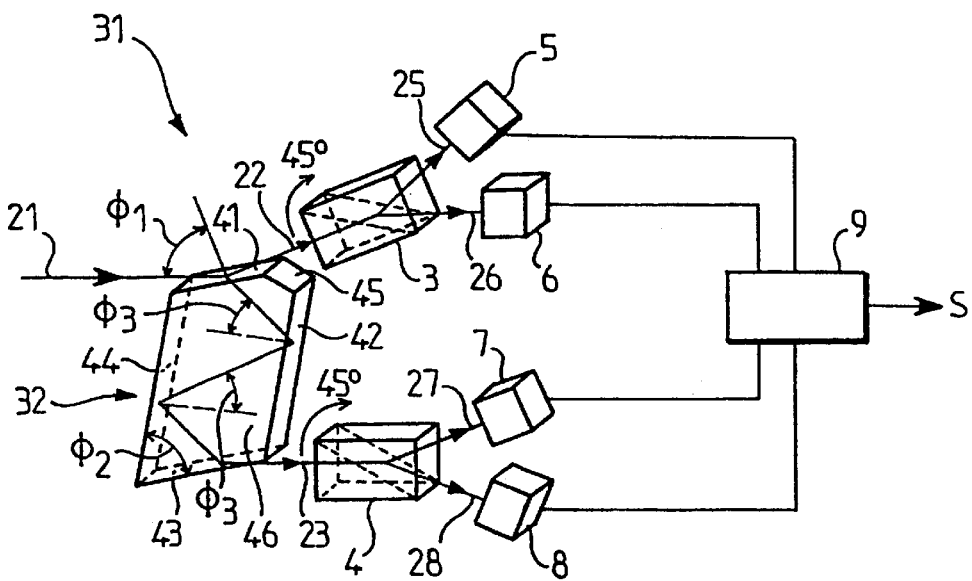
FIG. 2 represents a second embodiment of a polarimeter according to the invention.

On FIGS. 1 and 2, similar elements are designated by the same references.

A polarimeter 1, represented on FIG. 1, comprises a prism 2 with a triangular base 16. The prism 2 comprises three faces 11, 12 and 13 (perpendicular to the plane of the sheet), corresponding respectively to sides of the triangular base 16. The faces 11 and 12 form between themselves an angle $\phi_2$ and the faces 12 and 13 form between themselves an angle $\phi_5$. The prism 2 does not comprise any surface treatment and has a refraction index $n_P$. It is designed for receiving on its face 11 an incident beam 21 according to an angle of incidence $\phi_1$, and for separating it into a reflected beam 22 and a transmitted beam 23. The angles $\phi_1$, $\phi_2$ and $\phi_5$ and the refraction index $n_P$ are chosen so that the transmitted beam 23 reaches the face 12 of the prism 2 according to an angle of incidence $\phi_3$, is then totally reflected on this face 12 and finally goes out through the face 13 perpendicular to this face 13.

The polarimeter 1 also comprises two Wallaston prisms 3 and 4 oriented at 45° with respect to the plane of incidence, designed for receiving respectively the reflected 22 and transmitted 23 beams and for separating each according to two final beams, respectively referred to as 25 and 26 for the reflected beam 22, and 27 and 28 for the transmitted beam 23.

Photodetectors 5–8 are arranged so that the intensities $i_1$–$i_4$ of the final beams 25–28 can be measured respectively. They are linked to a processing unit 9, which produces the Stokes S vector of the light of the incident beam 21 from the intensities thereof. The photodetectors 5– are for example photomultiplier tubes.

In an advantageous embodiment, the prism 2 consists of ZnS, optimised for applications in the visible and infrared ranges, from 0.4 μm ($n_P$=2.41) to 14 μm ($n_P$=2.15).

According to a first example of this advantageous embodiment:

$\phi_1$=81.2°, $\phi_2$=56.9°, $\phi_5$=32.8°.

This example with rasing incidence is extremely efficient (conditioning s(A)=0.57) and relatively sensitive to the angle of incidence (sensitivity δ(A)=2.74).

According to a second example of this advantageous embodiment:

$\phi_1$=48.4°, $\phi_2$=50.8°, $\phi_5$=32.8°.

This example produces relatively correct efficiency (conditioning S(A)=0.2) and very little sensitivity to the angle of incidence (sensitivity δ(A)=0.33). Moreover, this configuration is quite convenient from a geometrical viewpoint.

Another polarimeter 31 comprises a prism 32 having a polygonal base 46. The prism 32 comprises five faces 41–45, bearing upon sides of the base 46, perpendicular to this base 46. The faces 41 and 43 are parallel, as well as the faces 42 and 44. The face 43 forms with the face 44 an angle $\phi_2$. Thus, the face 41 and the face 42 form also this angle $\phi_2$ but the comer formed by the faces 41 and 42 is truncated, in order to form the fifth face 45.

In operation, the face 41 receives the incident beam 21 and makes the separation into a reflected beam 22 and a transmitted beam 23. The transmitted beam 23 reaches the face 42 with an angle of incidence $\phi_3$ and is reflected thereto totally, then, reaches the face 44 with the same angle of incidence $\phi_3$, on which it is reflected totally. It then goes out through the face 43. The face 45 is eventually ground or blackened to stop the interference beam coming from the face 43.

The other elements of the polarimeter 31 are similar to those of the polarimeter 1 and operate identically.

In an advantageous embodiment, dedicated to applications in the visible and close-to-infrared ranges, the prism 32 consists of a glass material, for example of the type marketed under the reference FBS E00-46 by CORNING S.A. Its refraction index $n_P$ decreases thus from 1.83 for 0.4 μm to 1.76 for 2 μm. For a wavelength equal to 0.488 μm, 10% of the intensity of the transmitted beam 23 being absorbed in the prism 32, the prism 32 of the sample is such that:

$n_P$=1.812, $\phi_1$=78.5°, $\phi_2$=68°.

The matrix $A_{exp}$ measured experimentally is then equal to:

$$A_{exp} = \begin{pmatrix} 425 & 0 & 0 & 0 \\ 0 & 375 & 0 & 0 \\ 0 & 0 & 336 & 0 \\ 0 & 0 & 0 & 312 \end{pmatrix} \begin{pmatrix} 1 & -0.65 & -0.81 & -0.04 \\ 1 & -0.54 & 0.82 & 0 \\ 1 & 0.6 & 0.06 & 0.83 \\ 1 & 0.54 & -0.08 & -0.83 \end{pmatrix}$$

It is very close to its theoretical value. Moreover, the angle $\phi_3$ is approximately 35°. The efficiency obtained is very high (conditioning measured s($A_{exp}$)=0.5 and theoretical conditioning s(A)=0.56). Moreover, the theoretical sensitivity δ($A_{exp}$) to the angle of incidence is equal to 2.6. The reduction of the angle of incidence $\phi_1$ enables to reduce the sensitivity to the angle of incidence, while diminishing the efficiency.

Moreover, the dispersion of the refraction index from 0.4 µm to 2 µm leads to a variation of a few percent in the matrix A. Gauging must therefore be conducted at various wavelengths. The transmitted beam 23 exhibits a small spatial dispersion compatible with most optical windows of polarisers and of photodetectors arranged at reasonable distance from the prism 32.

For comparison purposes, a division-of-amplitude polarimeter comprising a beam separator covered with dielectric or semi-conductor (K. Brudzewski, Journal of Modern Optics, vol. 38, p. 889, 1991) corresponds to a conditioning in the order of 0.1 to 0.2 and in the order to 0.3 to 0.4 respectively and to a sensitivity to the angle of incidence in the order of 2.6. The polarimeter according to the invention therefore enables to improve these performances significantly.

What is claimed is:

1. A polarimeter (1,31) comprising:
    an initial separator designed for separating an incident beam of light to be measured with a Stokes vector into a reflected beam and a transmitted beam, whereas the said separator has a reflection coefficient, a couple of ellipsometric angles in reflection, a transmission coefficient and a couple of ellipsometric angles in transmission,
    two final separators designed for separating respectively each of the reflected and transmitted beams into at least two final beams,
    means for detection designed for measuring the intensities of the final beams, and
    a processing unit linked to the means of detection, producing the Stokes vector of the light to be measured,
    wherein the initial separator comprises a prism that does not induce any interference effect and having properties, notably such a refraction index and a configuration that the transmitted beam undergoes at least one reflection internal to the said prism according to an angle of internal reflection.

2. A polarimeter according to claim 1, wherein at least one of the reflections internal to the prism of the initial separator is a total reflection.

3. A polarimeter according to claim 1, wherein at least one of the reflections internal to the prism of the initial separator is a reflection on a thick absorbing layer.

4. A polarimeter according to claim 1, wherein that the prism has a triangular base comprising a first side, a second side forming a first angle of aperture with the first side and a third side forming a second angle of aperture with the second side, wherein the first, second and third sides of the base are respectively associated with the first, second and third faces of the prism, wherein the said incident beam reaching the first face according to an angle of incidence parallel to the base and separated on the first face into the reflected and transmitted beams, whereby the transmitted beam undergoes the internal reflection on the second face and goes out through the third face.

5. A polarimeter according to claim 4, wherein the internal reflection is total, the refraction index of the prism ranges between 2.5 and 2.0 over a wavelength range between 0.4 µm and 14 µm and the angle of incidence and the first and second angles of aperture are respectively 81°, 57°, and 33°, plus or minus one degree.

6. A polarimeter according to claim 4, wherein the internal reflection is total, the refraction index of the prism ranges between 2.5 and 2.0 over a wavelength range between 0.4 µm and 14 µm and the angle of incidence ($\phi_1$) and the first and second angles of aperture ($\phi_2,\phi_5$) are respectively 48°, 51°, and 33°, plus or minus one degree.

7. A polarimeter according to claim 1, wherein the said prism has a polygonal base comprising at least a first side, a second side forming with the first side an angle of aperture, a third side parallel to the first side and a fourth side parallel to the second side, whereas the first, second, third and fourth sides of the base are respectively associated with first, second, third and fourth faces of the said prism, whereas the incident beam reaches the first face according to an angle of incidence parallel to the said base and is separated on the first face into the reflected and transmitted beams, whereas the transmitted beam under-goes respectively a first and second internal reflections on the second and fourth faces and goes out through the third face.

8. A polarimeter according to claim 7, wherein the internal reflections are total, the refraction index of the prism ranges between 1.85 and 1.75 on a wavelength range comprised between 0.4 and 2 µm and the angle of incidence and the angle of aperture are respectively 78.5°, 68°, plus or minus one degree.

9. A method for measuring polarisation states of a light beam with a Stokes vector, comprising the steps of:
    separating the light beam to be measured into a reflected beam and a transmitted beam,
    separating each of the reflected and transmitted beams into at least two final beams,
    measuring the intensities of the final beams, and
    producing the Stokes vector of the light to be measured on the basis of said intensities,
    wherein the transmitted beam undergoes at least one reflection internal to a prism without inducing any interference effect.

10. A polarimeter comprising:
    an initial separator designed for separating an incident beam of light to be measured with a Stokes vector into a reflected beam and a transmitted beam, wherein the separator has a reflection coefficient, a couple of ellipsometric angles in reflection, a transmission coefficient and a couple of ellipsometric angles in transmission,
    two final separators designed for separating respectively each of the reflected and transmitted beams into at least two final beams,
    means of detection designed for measuring the intensities of the final beams, and
    a processing unit linked to the means of detection, producing the Stokes vector of the light to be measured,
    wherein the initial separator comprises a prism that does not induce any interference effect and having properties, notably such a refraction index $n_p$ and a configuration that the transmitted beam undergoes at least one reflection internal to the prism according to an angle of internal reflection, and
    wherein at least one of the reflections internal to the prism of the initial separator is a total reflection, and the angles of internal reflection $\phi_3$ corresponding to the total reflections verify approximately the following relation:

$$\cos \phi_3 = \sqrt{\frac{n_p^2 - 1}{n_p^2 + 1}}.$$

* * * * *